Dec. 28, 1948.　　　A. F. SHAFTER　　　2,457,608
ELECTRIC HEATING ELEMENT
Filed Nov. 9, 1945
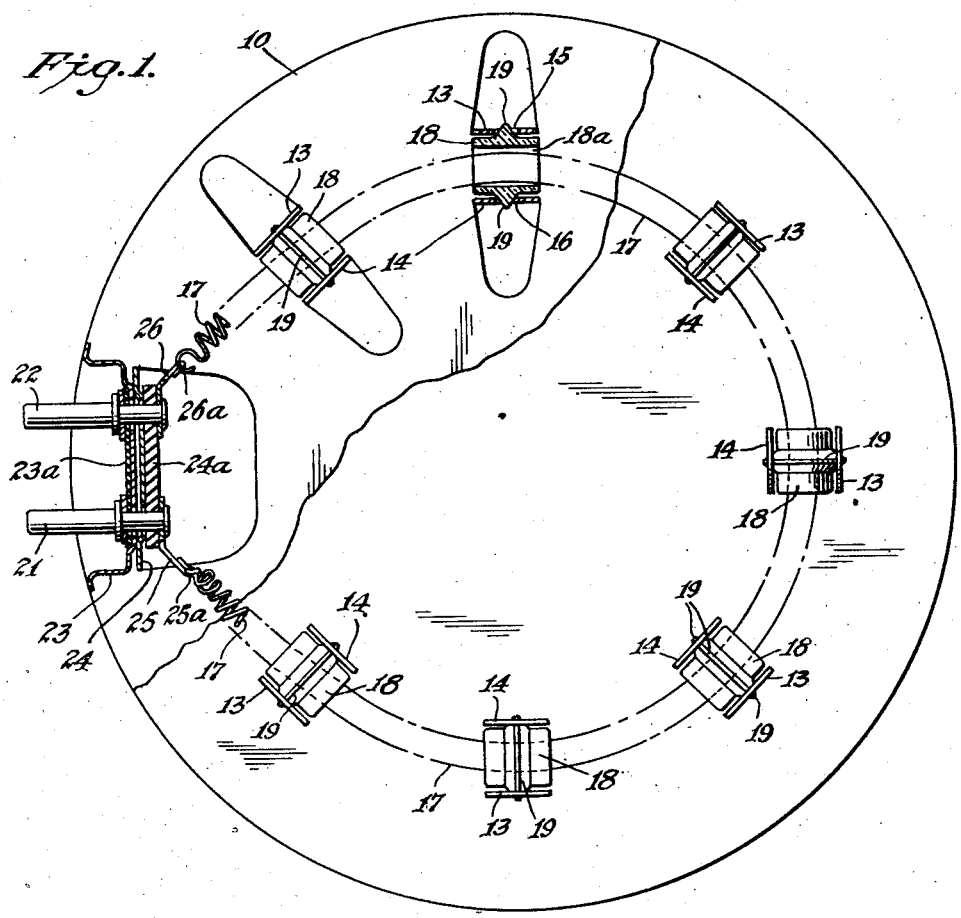
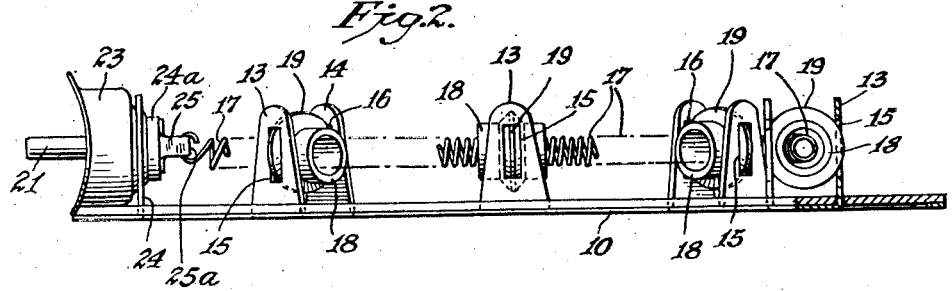
INVENTOR
ADOLPH F. SHAFTER
BY
ATTORNEYS Patented Dec. 28, 1948

2,457,608

UNITED STATES PATENT OFFICE 2,457,608

ELECTRIC HEATING ELEMENT

Adolph F. Shafter, Decatur, Ill., assignor to U. S. Manufacturing Corporation, Decatur, Ill., a corporation of Illinois Application November 9, 1945, Serial No. 627,651

3 Claims. (Cl. 219—19)

This invention relates to electric heating elements and primarily to elements of such character as may be adapted for use with common household appliances, such as food warmers, corn poppers, or the like.

A principal object of the invention is to provide heating elements of this character that are simple and cheap to manufacture and that may be readily and quickly assembled.

Another object of the invention is to provide heating elements of this character that are rugged in construction and capable of withstanding considerable abuse during use.

A further object of the invention is to provide heating elements of this character in which the heating coil is safely insulated from metallic parts to minimize danger of shock to the user.

To the accomplishment of the foregoing and such other objects as may hereinafter appear, this invention consists in the novel construction and arrangement of parts hereinafter described and then sought to be defined in the appended claims, reference being had to the accompanying drawing, forming a part hereof, which shows merely for the part of illustrative disclosure, a preferred embodiment of the invention, it being expressly understood, however, that changes might be made in practice within the scope of the claims without digressing from the inventive ideas.

In the drawing:

Fig. 1 is a top plan view of the heating element, parts being broken away and sectionalized to illustrate details of construction; and Fig. 2 is a side elevation of the device of Fig. 1, partially in section, to illustrate details of construction.

Referring to the drawing, 10 denotes a disc or plate-like member, preferably of thin metal. In the embodiment shown, this member has substantially circular form and is provided in its surface with a plurality of sets of stamped out flanges or wings 13, 14 that are bent to extend laterally of the face of the plate or disc 10. These flanges 13, 14 of each set extend parallelly with respect to each other, and the sets of flanges 13, 14 are arranged concentrically about the center of the disc. The flanges 13 and 14 are provided, respectively, with the facing, vertically or longitudinally extending slots 15, 16, spaced vertically from the face of member 10 for a purpose presently to be described.

An electrical resistance heating coil 17 is provided which is adapted to be supported in spaced relationship from and by the flanges 13, 14. To this end, the tubular members 18 of insulating material such as porcelain or other ceramic or heat resisting and insulating materials, are provided. Each tubular member 18 has a surface projection, for example, in the form of an annular enlarged portion or bead 19. The diameters of these beads 19 are admeasured so that they will extend at opposite sides of the tubular members into the oppositely facing slots 15, 16 provided at each pair or set of flanges 13, 14. The said flanges 13, 14 possess sufficient resiliency to be spread for the insertion of the beads 19 within the said slots 15, 16 and to thereafter spring together to retain the tubular members 18 securely on the flanges 13, 14. The heating element 17 is threaded through the openings 18a in the tubular members and, because of the concentric arrangement of the flanges 13, 14, the heating coil 17 extends in substantially circular form relative to the center of the disc but in spaced relationship therefrom. The openings 18a preferably have considerably larger diameter than the external coil diameter.

A pair of contact prongs 21, 22 are suitably insulated from an electric plug receiving socket 23 that is attached by these prongs to a flange 24 upstanding from 24 to the plate 10. The insulation 23a insulates these prongs from the socket 23, and similar insulation 24a insulates them from flange 24. The respective prongs 21, 22 are provided with attaching flanges or lugs 25, 26, and the opposite ends of the heating coil 17 are conveniently hooked or otherwise attached in eyelets or junctions 25a, 26a of the respective lugs 25, 26, so as to provide a good electrical joint. Inasmuch as the heating element or coil 17 must be stretched to separate the individual windings, ordinarily enough tension is provided by the heating coil itself to maintain good electrical connection with the lugs 25, 26 at the junctions 25a, 26a when the coil ends are attached thereto.

In the assembly of the heating element construction described, the pre-stamped disc 10 with its sets of flanges 13, 14 has the socket 23 attached thereto by the prongs or terminals 21, 22. Thereafter, these assemblies are fitted with the insulating tubular members 18 and finally the heating coils 17 are threaded through these tubular elements 18 and their ends joined at 25a and 26a to the lugs 25, 26 of the electrical prongs 21, 22. The tubular elements or members 18 serve not only to support the heating coil 17 but maintain it in spaced and insulated relationship relative to the flanges or supports 13, 14 and the metal disc 10.

Furthermore, with the construction described, a minimum surface area of the heating coil 17 is covered by the insulating material of the members 18. As a result, a maximum amount of the heat developed in the coil 17 upon passage of an electric current can be used effectively for heating either by direct radiation or by convection. That is, the insulating members 18 have such a small comparative area as to be negligible insofar as impairment of heating efficiency is concerned. This is an important aspect of the invention because it reduces the amount of electrical energy necessary to supply the required amount of heat for effective heating in household units, such as corn poppers, or food warmers, or the like.

While a specific embodiment of the invention has been disclosed, it is to be understood that changes within the scope of the claims are contemplated. There is no intention, therefore, of limitation to the exact details shown and described.

What is claimed is:

1. In a device of the character described, a plate-like metallic member, pairs of parallelly arranged spaced apart flanges integral with and upstanding from a face of said member, each of the flanges having a longitudinally extending slot spaced from the said face with the slots of the flanges of each pair of flanges extending in substantial parallellism, tubular insulating elements, said elements each having an annular projection or bead positioned at opposite sides of the element within oppositely facing slots of a pair of the spaced apart flanges, with the flanges of each pair clamping a tubular element between them, each tubular element being thereby supported in spaced relationship from said face of said member, an electrical heating coil threaded through the so supported tubular elements, electrical terminals and means for attaching said coil to said terminals.

2. In a device of the character described, a plate-like metallic member, sets of parallelly arranged spaced apart flanges upstanding from a face of said member, each of the flanges having a longitudinally extending slot spaced from the said face with the slots of the flanges of each pair of flanges extending in substantial parallellism, tubular insulating elements, said elements each having an annular projection or bead positioned at opposite sides of the element within oppositely facing parallel slots of the flanges of a set and with the flanges of each set clamping the tubular element between them whereby a plurality of said tubular elements are supported in spaced relationship from said face of said member, an electrical heating coil threaded through the so supported tubular elements, an additional flange upstanding from said metallic member, a plug receiving socket, electrical terminals joining said socket and said last-named flange, means for insulating said terminals from said socket and said last-named flange, and means for attaching said heating coil to said terminals.

3. In a device of the character described, a plate-like metallic member, sets of parallelly arranged spaced apart flanges upstanding from a face of said member, each of the flanges having a longitudinally extending slot, with the slots of the flanges of each set extending in substantial parallellism with each other and substantially perpendicular to the face of said plate-like member, tubular insulating elements provided with surface projections extending into the slots of the flanges, one such element only being supported between flanges of a set, an electrical heating coil threaded through the tubular elements so supported, and electrical terminals, said heating coil being joined electrically to said terminals.

ADOLPH F. SHAFTER.

REFERENCES CITED

The following references are of record in the file of this patent:

UNITED STATES PATENTS

| Number | Name | Date |
|---|---|---|
| 1,165,451 | Ruckle | Dec. 28, 1915 |
| 1,637,391 | Russell | Aug. 2, 1927 |
| 1,647,346 | Ehrgott | Nov. 1, 1927 |
| 2,019,780 | Gough | Nov. 5, 1935 |